United States Patent
Engel

(10) Patent No.: US 9,541,285 B2
(45) Date of Patent: Jan. 10, 2017

(54) SOLID FUEL BURNER-GASIFIER METHODS AND APPARATUS

(71) Applicant: Thomas Wolfgang Engel, East Hampton, CT (US)

(72) Inventor: Thomas Wolfgang Engel, East Hampton, CT (US)

(*) Notice: Subject to any disclaimer, the term of this patent is extended or adjusted under 35 U.S.C. 154(b) by 430 days.

(21) Appl. No.: 14/043,373

(22) Filed: Oct. 1, 2013

(65) Prior Publication Data

US 2015/0090164 A1    Apr. 2, 2015

(51) Int. Cl.

| F23G 5/027 | (2006.01) |
|---|---|
| C10J 3/66 | (2006.01) |
| C10B 47/18 | (2006.01) |
| C10B 47/28 | (2006.01) |
| C10L 9/08 | (2006.01) |
| F23B 40/00 | (2006.01) |

(52) U.S. Cl.
CPC .............. *F23G 5/027* (2013.01); *C10B 47/18* (2013.01); *C10B 47/28* (2013.01); *C10J 3/66* (2013.01); *C10L 9/083* (2013.01); *F23B 40/00* (2013.01); *F23G 5/0273* (2013.01); *C10J 2200/154* (2013.01); *C10J 2200/158* (2013.01); *C10J 2300/0916* (2013.01); *C10J 2300/0956* (2013.01); *C10J 2300/0976* (2013.01); *Y02E 50/15* (2013.01); *Y02P 20/145* (2015.11)

(58) Field of Classification Search
CPC ........ F23G 5/027; F23G 5/0273; C10B 47/18; C10B 47/30; C10L 9/083; Y02E 50/15; C10J 2300/0916; C10J 2200/158
See application file for complete search history.

(56) References Cited

U.S. PATENT DOCUMENTS

| 4,516,674 A * | 5/1985 | Firth | B65G 31/04 100/156 |
|---|---|---|---|
| 4,988,239 A * | 1/1991 | Firth | F04D 23/003 198/617 |
| 5,051,041 A * | 9/1991 | Firth | F04D 23/003 198/617 |
| 5,356,280 A * | 10/1994 | Ponzielli | B29B 17/0026 100/156 |
| 5,485,909 A * | 1/1996 | Hay | F04D 5/001 198/642 |
| 7,784,415 B2 * | 8/2010 | Engel | F23B 10/00 110/101 R |
| 8,464,860 B2 | 6/2013 | Frey | |
| 8,475,552 B2 | 7/2013 | Depuy | |
| 9,150,790 B2 * | 10/2015 | Thorn | C10B 47/30 |
| 2007/0144411 A1 * | 6/2007 | Matysik | F23B 40/02 110/115 |
| 2008/0145156 A1 * | 6/2008 | Livingood | B65G 53/48 406/14 |
| 2010/0282643 A1 * | 11/2010 | Morris, Jr. | C01B 3/50 208/407 |

* cited by examiner

*Primary Examiner* — David J Laux
(74) *Attorney, Agent, or Firm* — Matthew J Patterson

(57) ABSTRACT

A system for thermally processing solid fuel to produce pyrolysis gases, syngas, tar, char, and/or torrefied products, which includes a bulk solids pump having a curved passage to move a feedstock therein and wherein the pump includes a spool supported for rotational movement. A sleeve shaped chamber or chambers surround all or a portion of at least an axial extent of said curved passage to permit containment of heated gases to heat solid fuel within the curved passage to thermally process the feedstock within the pump.

7 Claims, 9 Drawing Sheets

Enlarged Section CC

HETEROGENEOUS REACTIONS

| | | |
|---|---|---|
| i | $C_s + \frac{1}{2}O_2 \longrightarrow CO_2$ | −111 kJ/mol |
| ii | $C_s + O_2 \longrightarrow CO_2$ | −394 kJ/mol |
| iii | $C_s + 2H_2 \longleftrightarrow CH_4$ | −74.8 kJ/mol |
| iv | $C_s + CO_2 \longleftrightarrow 2CO$ | +172 kJ/mol |
| v | $C_s + H_2O \longleftrightarrow H_2 + CO$ | +131 kJ/mol |

HOMOGENEOUS REACTIONS

| | | |
|---|---|---|
| vi | $CO + H_2O \longleftrightarrow CO_2 + H_2$ | −41.2 kJ/mol |
| vii | $CO + 3H_2 \longleftrightarrow CH_4 + H_2O$ | −206 kJ/mol |
| viii | $2CO + 2H_2 \longrightarrow CH_4 + CO_2$ | −247 kJ/mol |
| ix | $CO_2 + 4H_2 \longrightarrow CH_4 + 2H_2O$ | −165 kJ/mol |
| x | $CO + \frac{1}{2}O_2 \longrightarrow CO_2$ | −284 kJ/mol |
| xi | $H_2 + \frac{1}{2}O_2 \longrightarrow H_2O$ | −242 kJ/mol |
| xii | $CH_4 + 2O_2 \longleftrightarrow CO_2 + 2H_2O$ | −803 kJ/mol |

*FIG. 9*

SOLID FUEL BURNER-GASIFIER METHODS AND APPARATUS

CROSS-REFERENCE TO RELATED APPLICATIONS

This application contains subject matter which is related to the subject matter of U.S. Pat. No. 7,784,415 issued to the inventor herein namely Thomas Wolfgang Engel on Aug. 31, 2010. This patent is hereby incorporated herein by reference in its entirety.

TECHNICAL FIELD

The present invention is generally directed to gasifiers and combustors in general and to apparatus and methods related to controlled fuel feed and combustion of various solid fuels including biomass fuels, in particular. The term "solid fuels" and or "feedstock" as used herein refers to any type of non-fluid fuel capable of producing hydrocarbons in accordance with the methods described herein. Examples of the types of solid fuels within the scope of the present invention include by way of example, wood chips, wood pellets, nut shells, bagass, corn, and pelletized biomass. It also includes carbonaceous waste including ground up tires, plastics, and municipal solid wastes (MSW). Although the description herein focuses on biomass those skilled in the art will recognize the broader implications. Accordingly, the term feedstock as used herein is the solid fuel as described in this paragraph.

Alternative embodiments of the present invention relate to torrefaction of solid fuel into a higher energy density and moisture resistant fuel for power production in general and to an apparatus and methods related to controlled feed of feedstock to be torrefied and the extraction of energy from some of the feedstock to torrefy the feedstock as a whole.

Alternative embodiments of the present invention relate to pyrolysis of solid fuel into a biochar material for soil remediation and carbon sequestration in general and to an apparatus and methods related to controlled feed of feedstock to be torrefied and the extraction of energy from a portion of the feedstock to provide the energy to produce biochar.

Embodiments of the present invention relate to gasifiers and combusters in general and to an apparatus and methods related to the controlled fuel feed and thermal processing of the fed fuel for producing products that can include tar, char, pyrolysis gases, syngas, and or torrefied fuel.

BACKGROUND OF THE INVENTION

For many years now fixed bed gasifiers have been employed to produce syngas for running internal combustion engines and other means of power production. Fixed bed gasifiers act as a whole with each process tied into what is occurring with the other processes. Thus, it is difficult to separate the respective steps so that each process can be isolated from the other processes making control more difficult.

Conventional fixed bed gasifiers rely on gravity to move the solid fuel through the zones of gasification. Gravity feed is not conducive to handling solids because of the tendency of solid fuels toward bridging, tunneling, and clogging if the solid fuel is not the correct size, shape, density or moisture content. The applicant's prior patent refers to a solids pump such as a bulk solids pump manufactured and distributed by K-Tron Company of Pitman, N.J., USA. The pump is known for its ability to provide precise volumetric feeding of free flowing bulk materials, e.g. pellets and granules. The bulk solids pump feeder has a rotating spool that creates a product lock-up zone conveying the material smoothly from storage hopper located above a consolidation zone to an outlet. True, linear mass flow of particles is achieved. This principle is referred to herein as lock-up transport.

Bulk solids pumps employ one or more specially designed rotating spools which create curved passages. Incoming material is captured in the curved passage and rotated to discharge. While within the curved passage the material 'locks-up' and acts as a solid mass. Approaching discharge, inter-particle forces relax and discharge occurs by cascade at the material's natural angle of repose, or by the material being forced out by a barrier placed inside the curved passage which directs the locked-up material out of the curved passage.

The bulk solids pump principle is best explained as consisting of four sequential zones: (1) consolidation, (2) rotation, (3) relaxation and (4) discharge wherein in the first zone material enters the pump and consolidates as particles settle and come into contact with one another and the sides of the curved passage and at the end of the first zone the material is fully constrained by the curved passage, and inter-particle and surface contact forces produce the lock-up condition and wherein in the second zone the material rotates as a solid mass and as the material moves through the second zone to the third zone the material is approaching an unconstrained discharge where inter-particle forces fall, the material relaxes and regains its natural flowability and discharge of the material occurs in a fourth zone where passage rotation causes the material to cascade from the pump.

Fixed bed gasifiers rely on gravity to move fuel through the process steps of heating, pyrolysis, reduction and gasification. This limits the residence time in each of the processes because the position of the feedstock is not controlled and limits the residence depth because of the fixed contours of the apparatus and therefore fixed depth that a process can have.

The aspect ratios of fixed bed gasifiers are limiting. For example, the throat of an Imbert style gasifier is restricted to certain ratios of nozzle size and spacing to throat opening. Operating outside these constraints leads to incomplete gasification, tunneling and increased tar production and/or dilution of the gas energy density. For example the depth of the reduction zone is entangled with the amount of heat that can be created in the throat of the gasifer, which is limited by the fixed contours of the gasifier. Once this heat is exhausted by the endothermic reactions occurring in the reduction zone no more reduction reactions are favored.

The aspect ratio of an Imbert or downdraft gasifier, that is the ratio of the cross sectional area of the gasifier to its length needs to be larger compared with the apparatus in accordance with the present invention in order to support gravity feed. Because of this it is difficult to transfer waste heat back into the process where it is needed to improve efficiency. This leads to energy waste as the waste heat is dumped to the environment. In addition, Imbert or downdraft gasifiers are batch run machines requiring periodic cleaning and reloading.

The Imbert or downdraft machines require a portion of the feedstock to be burnt to create heat for heating and driving the endothermic processes of reduction and tar cracking. This combustion process introduces extra amounts of N2 into the syngas stream if the oxidant is air which dilutes the energy density of the syngas. The apparatus in accordance with the present invention uses waste heat or syngas combustion to drive the processes and these heat sources can remain external to the syngas quality itself.

Downdraft machines and other machines that rely on gravity for solid fuel feeding can only provide a limited amount of feedstock heating because of the aspect ratio and gravity dependent feedstock solid fuel feed issues presented above.

The applicant's prior patent describes advantageous apparatus and methods for improved delivery of solid fuel to a gasifier. It is now apparent that the prior art does not show various improvements that expand the possible processes that can be completed in such solids pumps More specifically, various structural changes in the pump enable recycling of process heat and or process gases to increase the efficiency of processes including torrefaction, pyrolysis, combustion, reduction and or gasification within the solids pump.

From the above, it is therefore seen that there exists a need in the art to overcome the deficiencies and limitations described herein and above.

SUMMARY OF THE INVENTION

The shortcomings of the prior art are overcome and additional advantages are provided through system for thermally processing solid fuel to produce pyrolysis gases, syngas, tar, char, and/or torrefied products which includes a bulk solids pump configured to move a solid fuel therein and wherein the pump includes a spool supported for rotational movement about an axis and having a geometric axis; a hoop surrounding at least an angular portion of the spool, the hoop being mounted in fixed relationship to the axis whereby upon rotation of the spool there is relative motion between the spool and the hoop; an inlet; an outlet; a curved passage within the spool disposed in communication between the inlet and the outlet. The curved passage extends within the spool, has a generally circular axis and four sequential zones: (1) consolidation, (2) rotation, (3) relaxation and (4) discharge wherein in the first zone solid fuel enters the pump and consolidates as particles settle and come into contact with one another and the sides of the curved passage and at the end of the first zone the solid fuel is fully constrained by the curved passage, and inter-particle and surface contact forces produce the lock-up condition and wherein in the second zone the solid fuel rotates as a solid mass and as the solid fuel moves through the second zone to the third zone the solid fuel is approaching an unconstrained discharge where inter-particle forces fall, the solid fuel relaxes and regains its natural flowability and discharge of the solid fuel occurs in a fourth zone where passage rotation causes the solid fuel to cascade from the pump. The system further includes one or more sleeve shaped chambers surrounding all or a portion of at least an axial extent of the curved passage to permit containment of heated gases to heat solid fuel within the curved passage to thermally process the solid fuel within the pump and thus permitting the advantageous conversion of the solid fuel to torrefied fuel, char, tar, pyrolysis gases and/or syngas.

In some embodiments the system further includes first and second bulkheads disposed at the axial extremities of one or more sleeve shaped chambers to substantially seal gases within the sleeve shaped chamber whereby improved heat transfer to the curved passage occurs.

The system may further include a sliding seal disposed intermediate each bulkhead and the spool to better contain hot gases within the sleeve shaped chamber. Some embodiments include a plurality of passageways defined in the spool and or hoop whereby heated gases introduced into one or more of the sleeve shaped chambers may penetrate through the passageways and into solid fuel contained in the curved passage to initiate thermal processing of solid fuel in the curved passage.

Some embodiments of the system further including at least one baffle that is movable to control passage of gas through the passageways defined in the spool and or hoop.

The present invention also includes the method for thermally processing solid fuel to produce pyrolysis gases, syngas, tar, char, and/or torrefied products which includes providing a bulk solids pump configured to move a solid fuel therein which includes a spool supported for rotational movement about an axis, and inlet, and outlet, a curved passage within the spool disposed in communication between the inlet and the outlet, the curved passage extending within the spool, the curved passage having a generally circular axis and four sequential zones: (1) consolidation, (2) rotation, (3) relaxation and (4) discharge wherein in the first zone solid fuel enters the pump and consolidates as particles settle and come into contact with one another and the sides of the curved passage and at the end of the first zone the solid fuel is fully constrained by the curved passage, and inter-particle and surface contact forces produce the lock-up condition and wherein in the second zone the solid fuel rotates as a solid mass and as the solid fuel moves through the second zone to the third zone the solid fuel is approaching an unconstrained discharge where inter-particle forces fall, the solid fuel relaxes and regains its natural flowability and discharge of the solid fuel occurs in a fourth zone where passage rotation causes the solid fuel to cascade from the pump; providing a hoop surrounding at least an angular portion of the spool and mounting the hoop in fixed relationship to the axis of the spool whereby upon rotation of the spool there is relative motion between the spool and the hoop; providing one or more sleeve shaped chambers surrounding all or a portion of at least an axial extent of the curved passage to permit containment of heated gases within sleeve shaped chamber(s) to thermally process solid fuel within the curved passage due to heat conduction through and heat radiation from the walls of the spool and or hoop in order to produce torrefied fuel, char, tar, pyrolysis gases and or syngas.

Some embodiments of the method further including the step of providing bulkheads at the axial extremities of a at least one sleeve shaped chamber to better contain hot gases therein as well as the step of providing a sliding seal intermediate each bulkhead and the spool to better contain hot gases within a given sleeve shaped chamber.

Some embodiments of the method further include providing a plurality of passageways defined in the spool and or hoop whereby heated gases introduced into a given sleeve shaped chamber may penetrate through the passageways and heated gases may travel around and or through the solid fuel contained in the curved passage to allow convective heat transfer of the heat in heated gases into the solid fuel as well as providing as least one baffle that is movable to control passage of gas through the passageways defined in the spool and or hoop.

The method may further include the step of directing hot gases from an independent process such as exhaust from an internal combustion engine or exhaust from a heat exchanger into one or more of the sleeve shaped chambers and/or the step of directing hot gases produced by burning part or all of the pyrolysis gas and or syngas generated as product of thermal processing of the solid fuel by the current invention into one or more of the sleeve shaped chambers. The directing step may include directing oxidant starved hot gases into one or more of the sleeve shaped chambers and the oxidant starved gases may be exhaust from an internal combustion engine or exhaust from a heat exchanger or exhaust from burning part or all of the pyrolysis gas and or syngas generated as product of thermal processing of solid fuel by the current invention into one or more of the sleeve chambers.

The method may further include feeding heated gases containing a controlled amount of oxidant into at least one of the sleeve shaped chambers. The gases then are directed to penetrate the passageways and travel around and or through sold fuel disposed within the curved passage. The oxidant gases when allowed to combust with the thermal products arising from thermal processing within the given sleeve shaped chamber and or thermal products arising from thermal processing occurring upstream of the given sleeve shaped chamber produces heat to provide energy for thermal processing occurring in the sleeve shaped chamber or downstream of the sleeve shaped chamber.

The method in some embodiments of the invention may further include providing combustible gases into at least one of the sleeve shaped chambers and then combusting the gases within the sleeve shaped chamber to produce heat to provide energy for thermal processing occurring in the given sleeve shaped chamber or downstream of the given sleeve shaped chamber.

The method may further include providing combustible gases to at least one of the sleeve shaped chambers and then combusting the gases within the sleeve shaped chamber to produce heated gases which penetrate into said passageways and travels around and or through the solid fuel to provide energy via convective heat transfer for thermal processing within the sleeve shaped chamber or downstream of the sleeve shaped chamber.

The method may also further include providing a separate high temperature reactor vessel cooperating with the output of the bulk solids pump thus creating a dual stage gasification apparatus where pyrolysis occurs in the solids pump and char reduction and or tar cracking occur in the high temperature reactor as well as providing a separate high temperature reactor vessel cooperating with the output of the bulk solids pump thus creating a dual stage gasification apparatus where pyrolysis occurs in the solids pump and char reduction and or tar cracking occur in the high temperature reactor.

Some embodiments of the system utilize a spool that has a hollow center and is carried by at least three shafts that are radially spaced from the geometric axis of the spool whereby part of the spool proximate to the geometric axis thereof is accessible and the shafts may be radially spring loaded to adapt to geometric imperfections and may include a sliding seal for blocking gas passage through a gap between the hoop and the spool. A barrier may be used at the outlet of the solids pump to force solid fuel from the pump, block gases from traveling further along the curved passage beyond the barrier and clean the curved passage of residual material.

Additional features and advantages are realized through the techniques of the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

The term "thermal processing" as used herein is meant to connote the conversion of solid fuel into one or more of the following: Tar, char, pyrolysis gases, syngas, dried solid fuel and or torrefied fuel, otherwise referred to herein as "thermal products":

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 9 is a chart of heterogeneous and homogeneous reactions that may occur in embodiments of the present invention.

DETAILED DESCRIPTION

Figure 1:
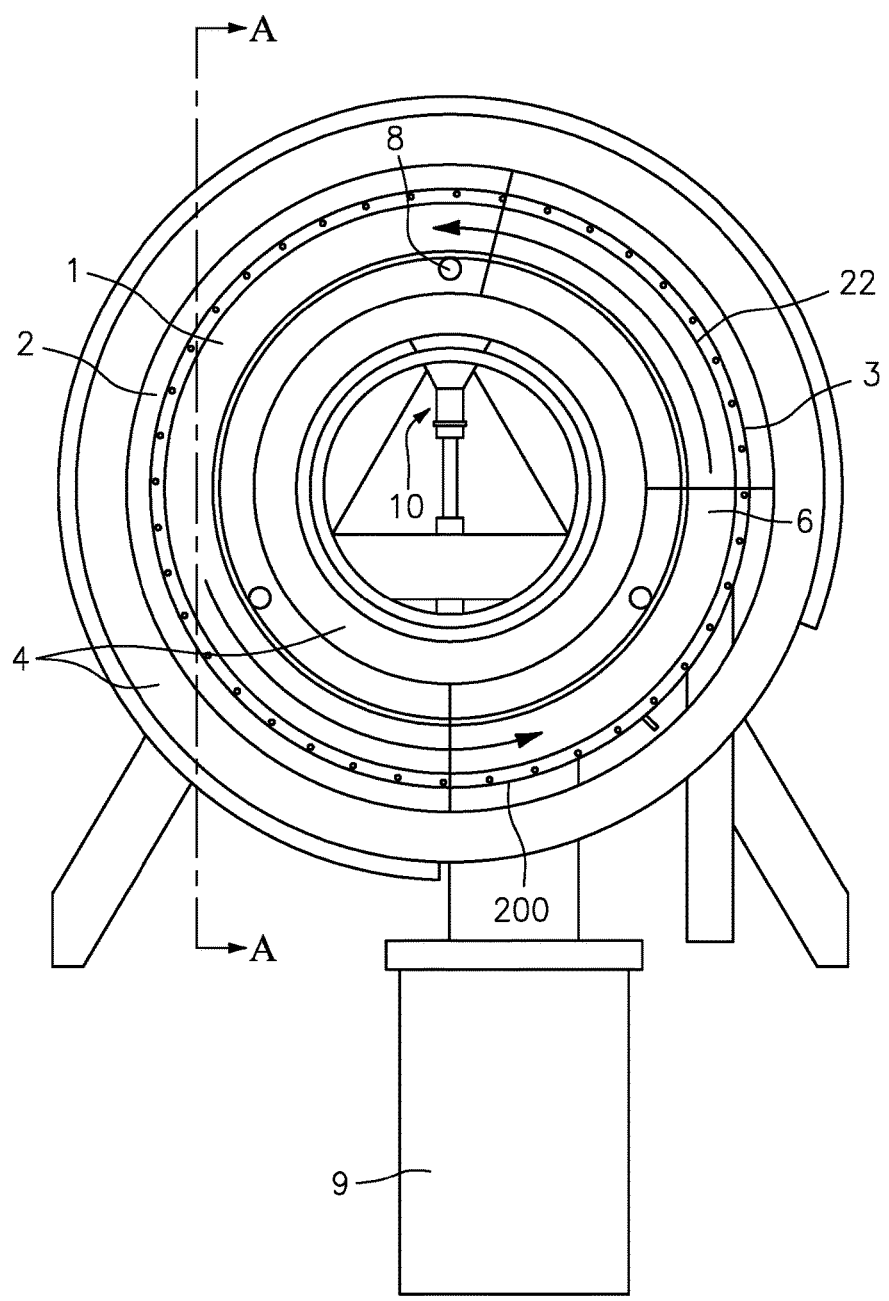
FIG. 1 is a schematic diagram of an embodiment of the current invention showing a spool 1 supported on three or more shafts.

Referring now to FIG. 1 is a schematic diagram of an embodiment of the current invention showing a spool 1 supported on three or more shafts 8. The top cover and insulation have been removed to allow viewing of the inner workings. The spool 1 is free to rotate about its axis. The spool 1 travels in an annular space 2 surrounding at least part of the spool 1. This annular space 2 is surrounded by insulation 4 so that the annular space 2 may be heated and thermally controlled more effectively. A hoop 3 is supported in stationary relationship with respect to the spool 1. The walls of the spool 1 cooperate with the hoop 3 to define the curved passage 25 shown in FIGS. 2 and 3. Feedstock 27 entering the curved passage through inlet 6 will lock-up inside the spool and travel with the spool in a generally fixed fashion with particles maintaining more or less the same positional relationship with each other while in the lock-up state. Feedstock 27 locked-up inside spool 1 will go through thermal processing while on its journey locked-up inside the spool 1. The thermally processed feedstock 27 will then exit spool 1 through outlet 200. In one embodiment the feedstock 27 could be deposited in reactor 9 where further thermal processing occurs.

Figure 5:
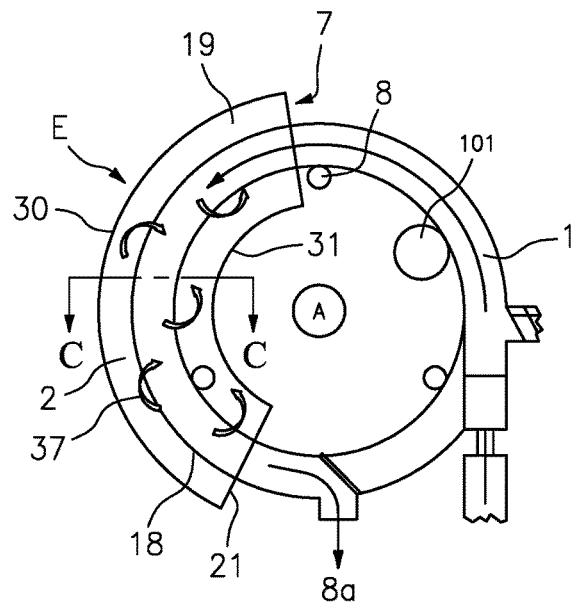
FIG. 5 is a another schematic block diagram of the current invention showing the generalized representation of a chamber built around the spool to form an annular region within which a section of the spool is disposed.

In the embodiment of FIG. 1 shafts 8 support spool 1 so that spool 1 rotates about a central axis A as show in FIG. 5.

The spool 1 and hoop 3 are collectively referred to herein as the solids pump.

Figure 2:
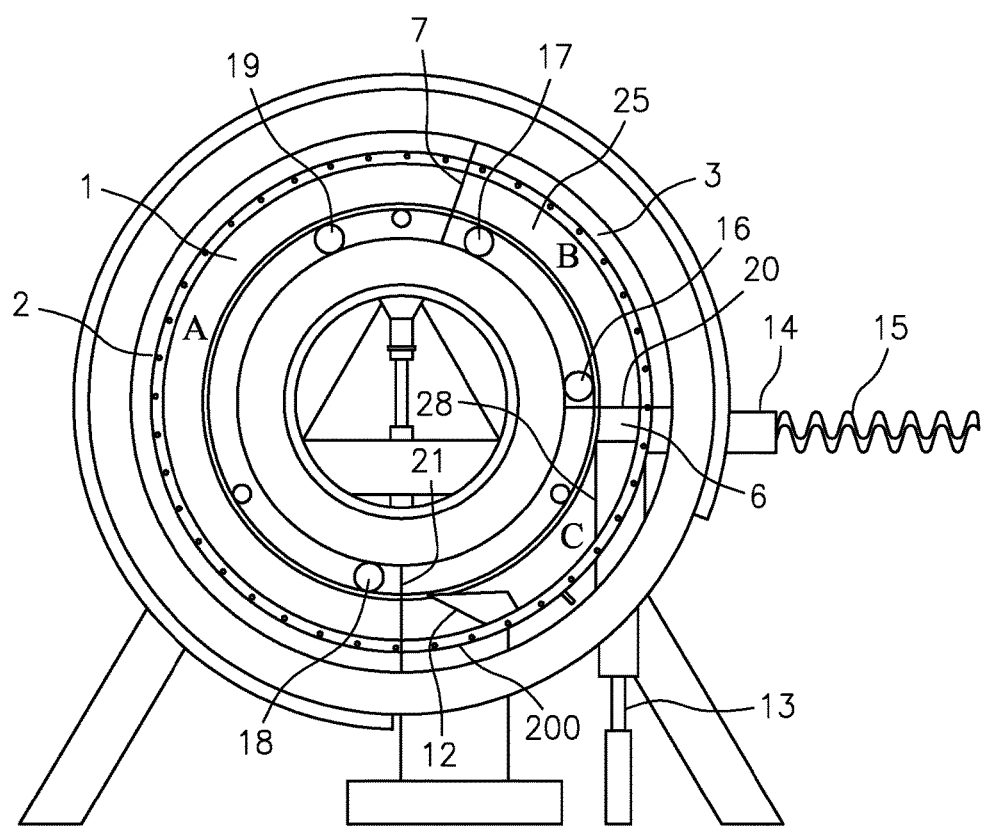
FIG. 2 is a schematic of the embodiment shown in FIG. 1 with the spool rendered in wireframe so as to show the curved passage of the spool.
Figure 4:
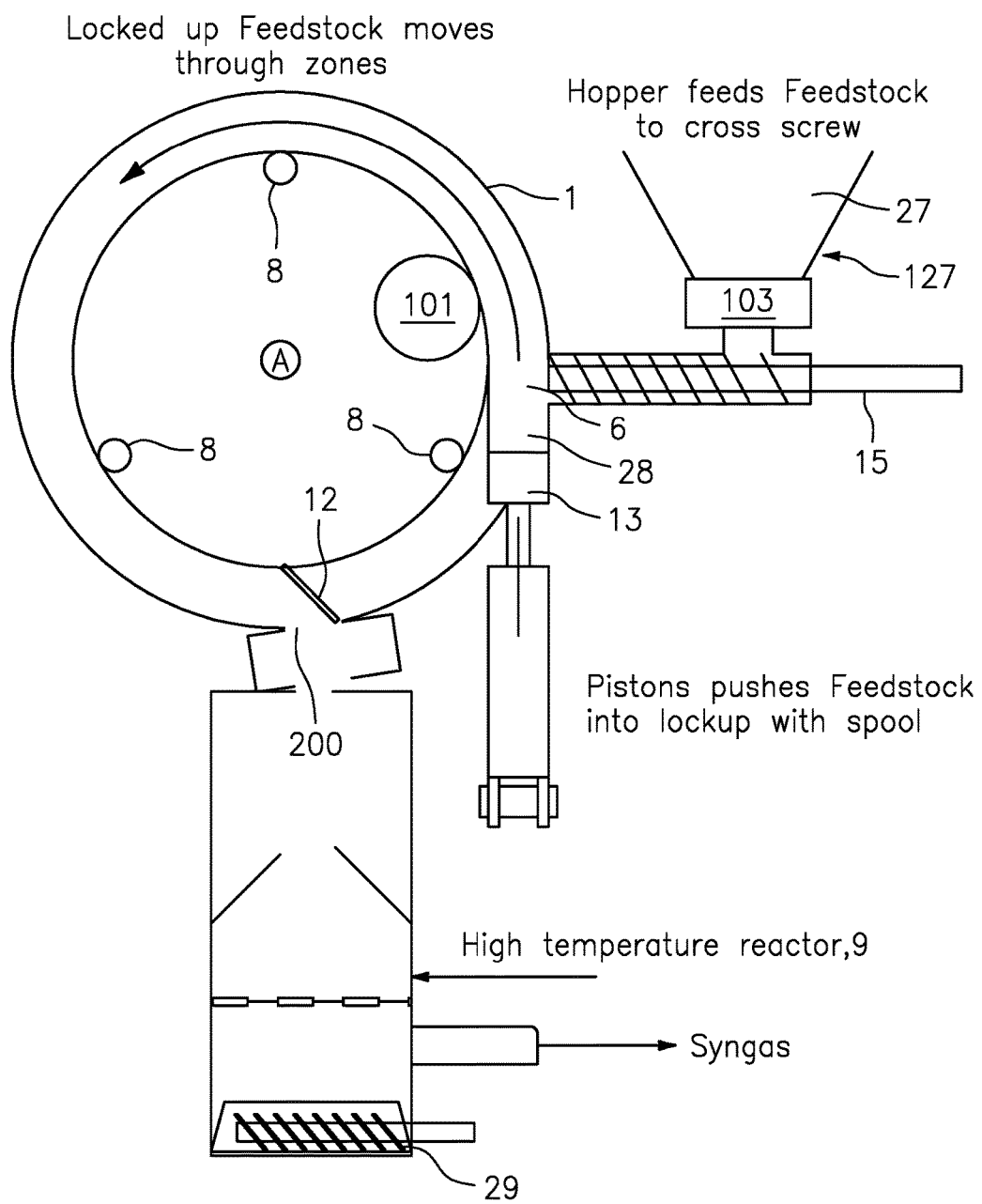
FIG. 4 is a schematic block diagram of the current invention showing an embodiment of how the solid fuel feedstock flows.

FIG. 2 is a schematic of the embodiment shown in FIG. 1 with the spool 1 rendered in wireframe so as to show the curved passage 25 of the spool 1. FIG. 2 as well as FIG. 4 schematically represents one method of introducing feedstock 27 into the spool 1 at inlet 6 of FIG. 1 and removing processed feedstock from the spool 1 at outlet 200. A screw 15 drives feedstock 27 through a conduit 14 to deposit the feedstock 27 into a chamber 28. A hydraulic piston 13 drives the feedstock 27 into the curved passage of the spool 1, locking it into the spool 1 and pushing the spool 1 about its axis. Barrier 12 directs processed feedstock 27 out of outlet 200 and barrier 12 cleans the spool by scraping away solid fuel from the walls of the spool. Barrier 12 also blocks gases from passing beyond the barrier. Sliding sleeves are in some embodiments incorporated between the barrier and the inner walls of spool 1 to further block gases from traveling beyond the barrier.

In one embodiment a high temperature reactor 9 receives the thermally processed feedstock and further thermally processes it. In one embodiment an auger 29 removes either the thermally processed feedstock or byproducts from thermally processing the feedstock 27. Although the description refers to a hydraulic piston pushing the feedstock 27 into inlet 6 other embodiments will use, as examples, an electric or pneumatic piston or a screw auger.

FIG. 2 schematically represents ports 18, 17 for introducing process gases, preferably heated gases, into the annular space 2 that includes regions A and B respectively as well as ports 19, 16 for removing process gases from the annular space 2 and specifically from regions A and B respectively. One or more bulkheads 7, 20, 21 placed inside the annular space 2 sub compartmentalize the annular space 2 into sub-compartments or regions A, B and C. Annular region C between bulkheads 21 and 20, shown in FIG. 2, in some embodiments is filled with insulation to retain heat and block gas flow through annular region C. The placement of the bulkheads 7, 20, 21 or others will vary for specific applications including the nature of the feedstock 27 as well as other variables. More specifically, the number of sub-compartments as well as the number of bulkheads like 7, 20, 21 will vary for the specific operating conditions or desired thermal products. The bulkheads like 7, 20, 21 partially or fully seal the annular spaces 2 with sliding seals which slide along the periphery of the spool 1.

Figure 3:
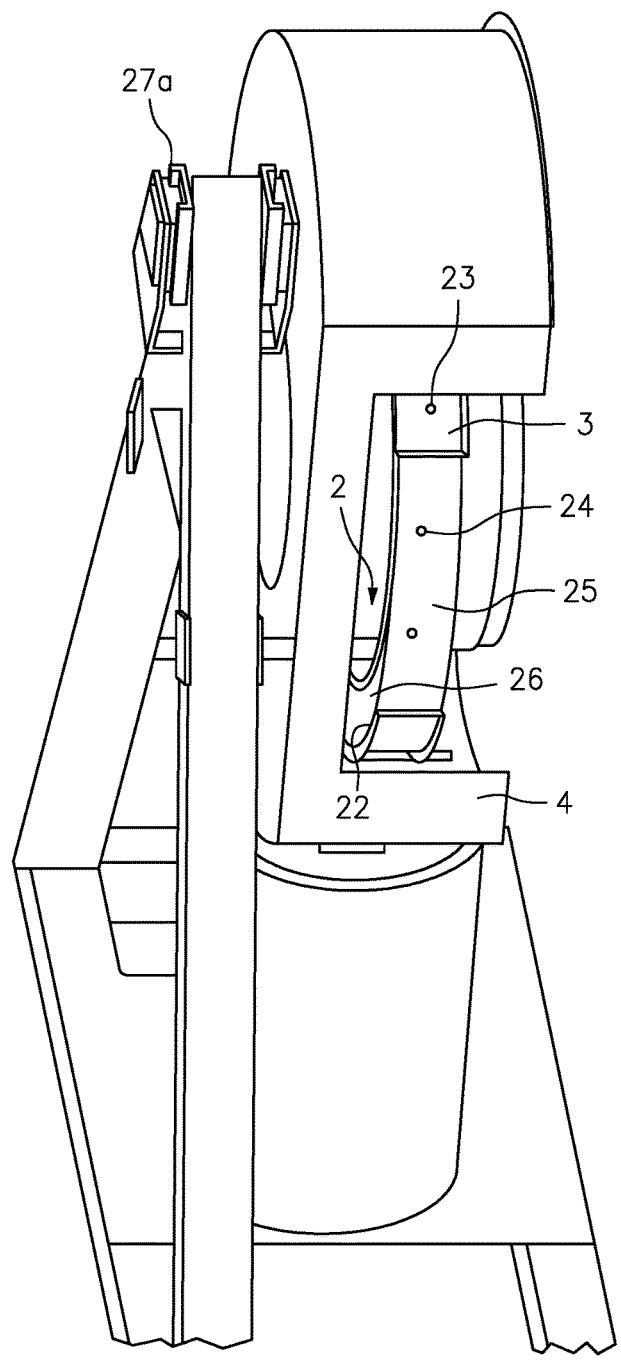
FIG. 3 is a schematic of the embodiment shown in FIG. 1 showing in a part thereof a sectional view or broken away view taken along the line A-A of FIG. 1.

FIG. 3 is a schematic view of an embodiment of the present invention shown in FIG. 1 in which the central part thereof is a sectional view taken along the line A-A of FIG. 1. Part or all of the spool 1 travels in an annular space 2 defined by the spool 1 and hoop 3 on the inside of the annular space and the insulation 4 defining the outside of the annular space. This annular space 2 is bounded by insulation 4 to allow for containment of high temperatures within the annular space. FIG. 3 shows the annular space 2, the curved passage of the spool 25, the outer hoop 3, the spring loaded take up mechanism 27a for shafts 8 of FIG. 1 and the insulation 4. A spring mounting of one or more of the shafts 8 permits adaptation to geometric irregularities between the spool 1, the hoop 35, and the frame and or shafts by which the spool 1 is supported.

Some embodiments include passageways to allow process gases traveling through the annular space/spaces 2 to pass through or around some or all of the particles making up feedstock 27. Representative passageways 22, 23, 24 and 26 represent the gap between the spool 1 and the hoop 3, the hoop 3, and passageways 24 and/or 26 in the walls of the spool 1, respectively. As used herein the term "passageway" is any perforation in a wall allowing for gas passage through the wall. Examples include holes, round holes, slits, or perforations in a wall of other geometric cross section.

The annular space 2 is pressurized in some embodiments with flowing hot gases. These hot gases heat the outside of the spool 1 and hoop 3 thus heating the feedstock 27 via conduction through, and radiation from, the walls of the spool 1 and hoop 3.

The annular space 2 enables recycling of heat in a controlled and deterministic manner to improve the efficiency, quality and speed of production of the thermal products of the apparatus. The hot gases could be a product of recycling the heat from processes of the apparatus as a whole.

For example:
1. The hot gases could be exhausted from a prime mover in the system intended to drive a generator to generate electricity.
2. The hot gases can emanate from a heat exchanger removing heat from syngas or producer gas leaving the reduction zone.
3. The hot gases may be generated by partial or full combustion of the product gases of the apparatus.
4. The hot gases may be generated by other processes of the plant in which the apparatus is installed.

FIG. 4 is a simplified schematic of an embodiment showing how feedstock 27 travels through the invention. The feedstock 27 might be previously prepared by chopping, milling, shredding, pulverizing, briquetting, or pelletizing. Hopper 127 feeds feedstock 27 into a screw 15 depositing the feedstock 27 into a chamber 28 above a piston 13. The screw 15 might instead be a piston. The piston 13 will be replaced by a screw in some embodiments. The piston 13 drives feedstock 27 into the spool curved passage 25 of FIG. 3 and causes the feedstock 27 to lock-up in the spool curved passage 25 of FIG. 3. The feedstock 27 travels in the locked-up state as the spool 1 rotates in response to the driving force of piston 13 about the axis A defined by bearings and or shafts 8. Some embodiments utilize three or more bearings and or shafts 8 to support the spool 1. As the feedstock 27 travels along with the spool it travels through processing regions described herein. Barrier 12 cleans the inside of spool 1 and directs processed feedstock 27 into downstream processes (e.g. reactor 9). Auger 29 removes ash and other products and or byproducts. Spool 1 rotates under force of inserting feedstock 27. Some embodiments include a motor 101 to assist in rotation of the spool 1 and/or act as a drag mechanism 101 holding the spool back in order to control locked-up feedstock 27 bulk density. Some embodiments include an air lock 103 along the path the feedstock takes as it travels from hopper to spool lock-up. This air lock may be included in some embodiments to remove or limit air in the feedstock. The pistons and screws listed in FIG. 4 might be hydraulically, pneumatically or electrically driven. It should be understood that while piston and screw are used as embodiments for moving feedstock there are other means of moving feedstock which constitute other embodiments.

FIG. 5 is a schematic of an embodiment of a thermal processing region. Feedstock 27 progresses in a locked-up state through processing region contained within chamber E. Chamber E consists of bulk heads 21 and 7 and a sleeve structure formed by an outer wall 30, inner wall 31 and top and bottom walls 33 and 32, all shown in FIG. 10. The walls of chamber E are insulated. This structure facilitates thermal processing of the feedstock 27.

Heated gas 37 can enter through ports 18 or 19 and exit through ports 19 or 18 respectively. This gas heats feedstock 27 that is locked up within the spool 1 through conduction through spool walls 34, 35 and 36 and hoop wall 3, all shown in FIG. 10, and/or radiation from the said spool walls and or hoop wall.

This gas 37 can be made to travel a circuitous route by directing its momentum tangential to the spool walls and perpendicular to the spool axis, so that the gas spends more time in the chamber E in order to increase the heat transfer into the feedstock 27 locked-up in the spool. In some embodiments the circuitous route the gas takes is further controlled by the use of baffling within the chamber E. Fins can be added to the walls of the hoop 3 to increase heat transfer into the feedstock 27 in lock-up with the spool 1. These techniques and others for increasing heat transfer and residence time are applicable here and well understood in the art of heat transfer.

The passageways into the curved passage 25 of FIG. 3 gas 37 can pass into the locked-up feedstock 27 due to pressure gradients between the annular space 2 and the curved passage 25 of FIG. 3 of the spool 1. Passageways into the curved passage 25 of the spool 1 where the feedstock 27 is locked-up include the possible gap 22 of FIG. 10 between the hoop 3 which is stationary and the side walls of the spool 34 and 36 of FIG. 10 which are in motion. Other passageways 23, 24 and 26 of FIG. 3 are referred to herein. If gas 37 is hot it will accelerate heating of the feedstock 27 due to convective heat transfer. The amount of heat transfer can be controlled by controlling the mass flow rate of the hot gases. This mass flow rate can be controlled by valves before the entry ports and/or after the exit ports. The control of the valves in some embodiments is manual and in other embodiments is automatically controlled by a controller as a result of process sensing. Controlling the amount of heat transfer is important to the operation of the apparatus. For instance, there may be too much pyrolysis gas produced for the downstream process to handle and this could lead to dirty syngas. Sensors measuring this undesirable result instruct the controller to change the mass flow rate of the hot gases thus reducing the pyrolysis reaction in some embodiments.

In some embodiments the hot gases introduced into the feedstock locked-up in the spool 1 can be starved of oxidant. For example, the exhaust gases from an internal combustion engine powered by the generated syngas or the hot gases exiting the combustion of some or all of the syngas or producer gas. Especially in the case of convective heat transfer as described herein it is sometimes desirable to have the hot gases starved of oxidant so as to control torrefaction and or pyrolysis by limiting combustion reactions including:

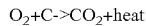

and/or

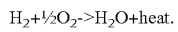

In some embodiments the hot gases 37 can have a controlled amount of oxidant. If these oxidant laden gases penetrate passageways 22, 23, 24, and or 26 and travel around and or through solid fuel 27 and are allowed to partially combust with said solid fuel and or thermal products this will produce heat to provide energy for thermal processing in the area of said combustion and or downstream from said combustion.

Figure 8:
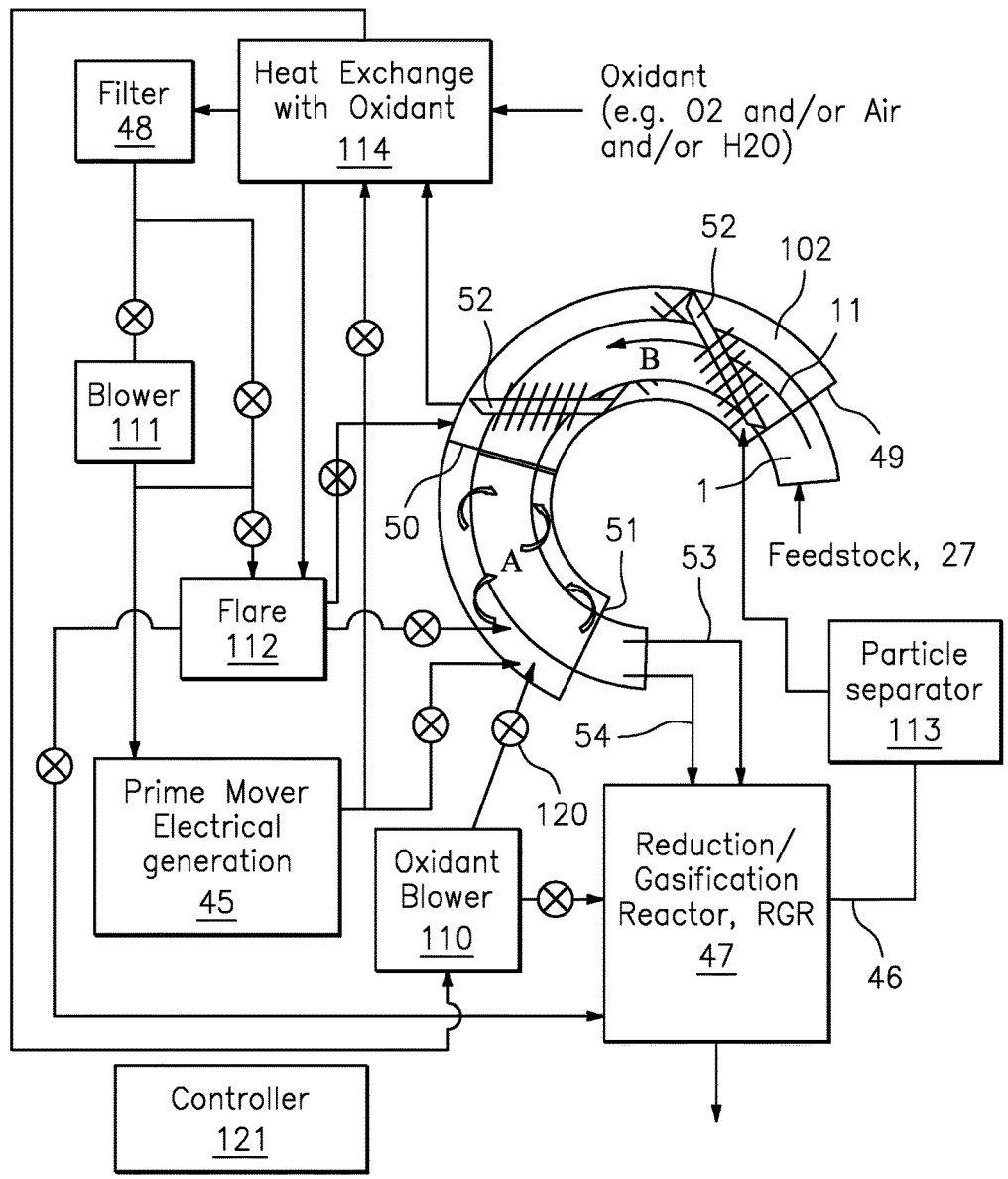
FIG. 8 is a schematic view depicting schematically a range of other embodiments of the invention.

The annular chamber E in some embodiments is provided with heat exchange tubing 52 as shown in FIG. 8 whereby heat is expelled into the annular space by blowing air or inert gas or gas starved of oxidant across the heat exchange tubing or fins. The heat exchanged from the tubing can be transferred into the incoming feedstock 27 in order to heat the feedstock 27, through conduction, radiation and/or convection heat transfer as described herein.

The annular space 2 and or the stationary hoop wall(s) can be fitted with electric resistance coils which could heat the feedstock 27 through conduction as well as the heat transfer mechanisms described above.

Heat can be extracted/exchanged from:
Hot Exhaust gases from prime mover
Hot exhaust gases from Partial/fuel combustion of producer gas or syngas
Heat exchange with exhaust gases from prime mover
Heat exchange with exhaust gases from Partial/fuel combustion of producer gas or syngas
Heat exchange with hot syngas produced by the invention
Heat exchange with other external processes
Hot gases from other external processes
Heat exchanger with an electric element in the path of the gases directed into chamber E.

The shafts 8 are an effective way for supporting spool 1 while eliminating the need for a hub to support the spool. In addition the shafts 8 allow for better access for heat transfer around the entirety of the spool 1 perpendicular to the geometric axis of spool 1, more particularly, the shafts allow for an uninterrupted annular space. The three shafts 8 instead of a hub minimize the conductive heat transfer out of spool 1 or chamber E. Also using three shafts 8 instead of a hub provides better access for implementing sliding baffles as described herein. Also using three shafts to support the spool permits placement of heat exchange tubing circumferentially about the spool 1 for uninterrupted heat exchange with spool 1 and hoop 3.

Figure 6:
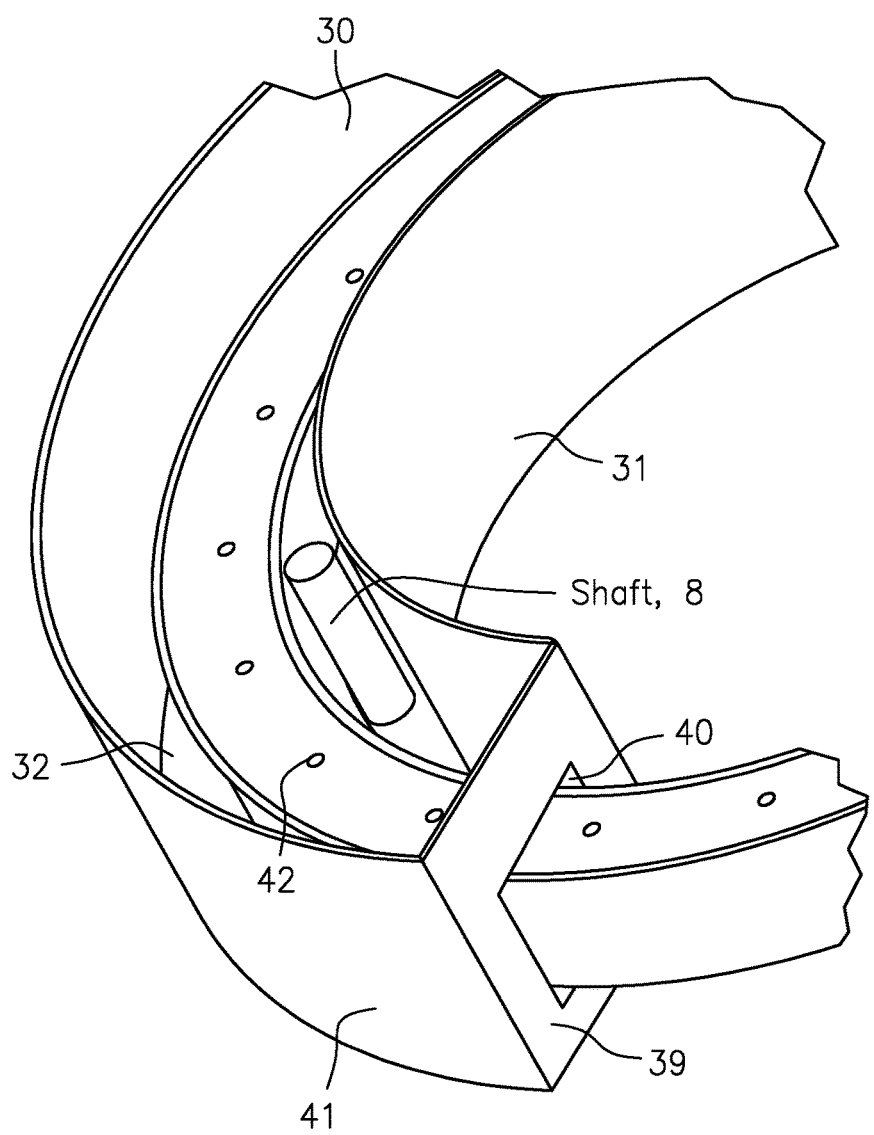
FIG. 6 is a partially schematic view of a portion of a chamber circumferentially surrounding a portion of the axial extent of a spool and the curved passage within the spool.

FIG. 6 is a schematic offering a more detailed view of a typical chamber 41 like E in FIG. 5. Bulkhead 39 similar to bulkhead 21 of FIG. 5 along with inner wall 31 and outer wall 30 and bottom wall 32 and (top wall 33 not shown for clarity) and bulkhead 7 of FIG. 5 (not shown for clarity) define the outer envelope of annular space contained by chamber 41. Shaft 8 partially supports the inner spool wall 35 of FIG. 10. In some embodiments each shaft 8 has an arbor or elongated support about which an outer sleeve rotates about the axis shaft 8. Shafts 8 allows the spool 1 of FIG. 1 to pass through the chamber in a controlled manner while minimally affecting gas flow in the annular space, and while minimally occupying the annular space. Those skilled in the art will recognize that sliding seals may be utilized over the gap 40 between the bulk head 39 and the spool walls 35, 34 and 36 of FIG. 5 in order to at least substantially prevent gases from escaping through the gap 40. Depending on the application these seals might need to be able to handle high temperatures of as much as 13000 C. Similarly, identical seals are used at both ends of the chamber 41. FIG. 6 shows additional passageways 42 (similar to passageways 26 of FIG. 3) in the spool walls to provide for gas passage into the feedstock in lock-up with the spool 1 of FIG. 1.

The walls and bulkheads of Chamber 41 can be sealed sufficiently so as to be able to hold pressures on the order of 10 or so inches of water for short periods of time, on the order of seconds. More than one chamber like 41 can be implemented in series along the length of the spool 1 of FIG. 1. Chambers (e.g. 41) can be adjusted in length or inner volume or position along spool 1 of FIG. 1 to position processes like heating, torrefaction, pyrolysis, combustion, reduction and gasification for optimum operational success in producing thermal products. While the walls of the chamber 41 are more or less rectangular in cross section in the illustrated embodiment they are in some embodiments multifaceted with more or less than 4 walls or have walls that are curved. In particular the walls form a curved cylindrical shape around the spool path in some embodiments.

Figure 7:
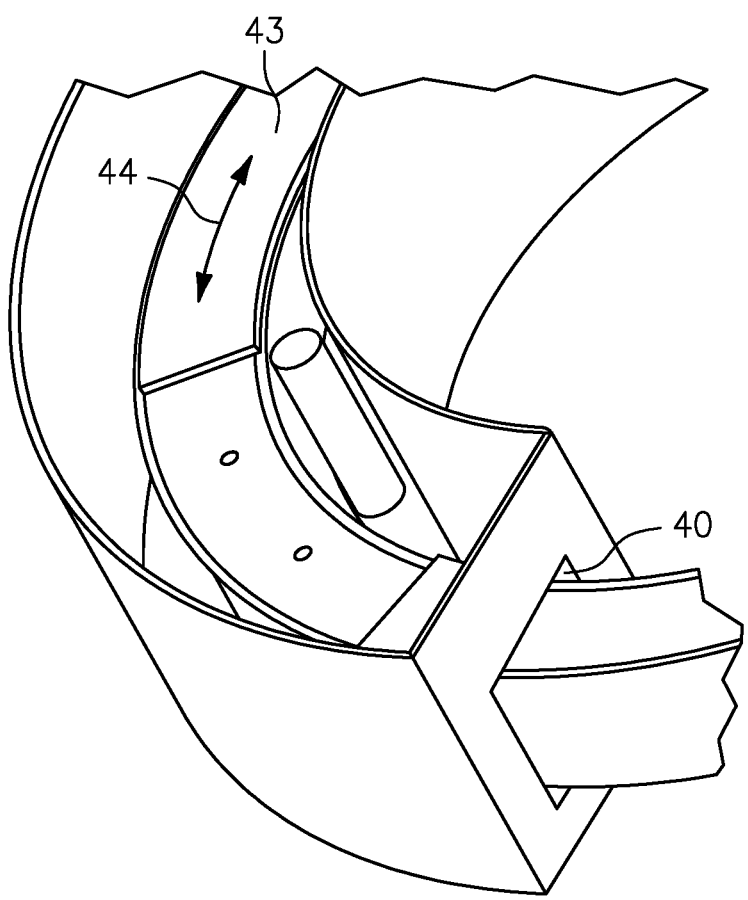
FIG. 7 is a schematic view of a portion of a chamber surrounding a portion of the axial extent of a spool and the curved passage within the spool showing the additional application of baffles to control the position of thermal processes.

FIG. 7 is the schematic of FIG. 6 showing an example of a movable baffle 43 which would block passageways such as 23, 24, and 26 of FIG. 3 or 42 of FIG. 6. One embodiment would have the baffles move along curved path 44 which follows the contour of spool 1 of FIG. 1. Similar baffles 3 could be positioned across the hoop walls like 3 of FIG. 10 to block passageways in hoop walls. Controlled opening of passageways into the locked-up feedstock 27 by use of adjustable baffling as described here permits adjustment of the positioning of thermal processing to the betterment of desired results. For instance, if a longer residence time is needed for a given thermal process opening passageways upstream provides for this.

FIG. 8 is a schematic of an embodiment where two sleeve shaped chambers A and B similar to 41 of FIG. 6 are placed in series along the length of the spool 1. The chamber B is defined by walls similar to 30, 31, 32, 33 of FIG. 10 and by bulkheads 49 and 50. Chamber A is defined by walls similar to 30, 31, 32, 33 of FIG. 10 and by bulkheads 51 and 50. While chambers A and B are shown sharing a single bulkhead 50 other embodiments may have discrete bulkheads.

It is beneficial to extract heat from the syngas exiting the reduction/gasification reactor 47. Doing so enhances its energy density and permits cleaning the gas using low temperature filters 48. This can be accomplished by disposing finned coiled tubing 52 in the annular space 102 of chamber B and forcing air across the outside of the coiled tubing through ports in the walls of chamber B. The inside of the coiled tubing is a conduit for the syngas. The mechanism described here is otherwise a typical embodiment of a shell and tube heat exchanger and is well understood in the art. While the embodiment of FIG. 8 shows the hot product gases entering on the cold entrance end of the feedstock 27, this does not have to be the case.

Other embodiments position the heat exchanger for the product gas outside of chamber B and direct the extracted heat into chamber B pursuant of the teachings of FIG. 5 through 7 above in order to heat the feedstock 27 in lock-up in spool 1 and traveling through chamber B. Still other embodiments remove some or all of bulkhead 50 in order to allow remnant heat from chamber A to travel on to chamber B for the purpose of heating the feedstock 27 disposed within chamber B.

The heated feedstock 27 continues with the rotation of the spool 1 into region A where it is pyrolysized or torrefied. The pyrolysis process and the torrefaction process is best accomplished by the heating of the feedstock 27 in an oxidant starved environment. Having an oxidant starved environment limits the degree of combustion possible which preserves most of the feedstock 27 while thermally decomposing the feedstock 27 into torrefied fuel, char, tar, stable gases including $H_2$, $CO$, $CO_2$, $H_2O$, $CH_4$ and short chain molecules of $C_xH_yOz$. Of course the actual makeup of the products of pyrolysis is a function of the makeup of the feedstock 27.

As noted above the pyrolysis or torrefaction can be carried out by hot gases in chamber A and directing the gases across the outer surfaces of the spool 1 and hoop 3. These hot gases heat the feedstock 27 by conduction of heat through the outer surfaces and radiation of the hot surfaces of the spool 1 and hoop 3. Because the hot gases do not penetrate into the feedstock 27 to a significant degree the hot gases need not be oxidant starved. Increased heating rates are achievable if some or all of the hot gases passing through chamber A are allowed to penetrate into the feedstock 27 through passageways described above. Doing so adds convective heat transfer to the conductive and radiative heat transfer discussed above. If these gases are oxidant starved then combustion is controlled, a richer syngas is produced and, in the case of torrefaction, fuel production is more efficient.

As discussed above the process of pyrolysis or torrefaction generates gases. These gases have partial pressures which increases the gas pressure inside the feedstock 27 locked-up in the internal volume of spool 1. It is recognized that these gases are explosive. It is further recognized that these gases are dangerous to life and the environment, being partially made up of CO and poisonous tars. It is further recognized that the tars will deposit on surfaces if allowed to escape and cool and condense outside of the spool 1 and that these deposited tars can have corrosive effects and cause tar buildup and plugging.

In an embodiment where a reactor operates in concert with the solids pump thermal processing unit, as is shown in FIG. 8, most or all of the pyrolysis gases 53 travel toward the lower pressure regions along the circumferential direction of the spool 1 and out through ports like 8a of FIG. 5 or reactor 9 of FIG. 1, otherwise shown as reactor 47 of FIG. 8. The pyrolysis gases will also try to escape through passageways like 23 24 26 of FIG. 3 and/or 22 of FIG. 10. The range of possible embodiments allows for some or all of the passageways 23, 24 and 26 of FIG. 5 to be not present. In addition the passageway 22 of FIG. 10 might be mostly or completely sealed with the use of a sliding mechanical seal or labyrinth seal, both well understood in the art.

While the above attempts to seal off or limit the passageways out of the spool inner volume are within the embodiments presented in this disclosure, a preferred embodiment would be to pressurize Chamber A with hot gases in the fashion described in FIG. 4-7 above, to a pressure equal to or greater than the sum of the partial pressures of the pyrolysis gases and atmospheric pressure. Doing so will prevent the escape of pyrolysis gases through passageways like 23 24 26 of FIG. 3 and/or 22 of FIG. 10. Doing so will also push the pyrolysis gases 53 out through desired exit port 8a of FIG. 5 or reactor 9 of FIG. 1 or 53 of FIG. 8 so that pyrolysis gases can travel on to the reduction and tar cracking reactor 47. Alternatively, if the embodiment has the tar cracking and reduction occurring inside the solids pump downstream of the pyrolysis, doing so will push the gases downstream to reduction and tar cracking regions downstream and within the solids pump. The applicant has conducted testing of prototypes which confirm the teachings of this paragraph. It should be appreciated that the aspect ratio of spool cross sectional area 55 of FIG. 10 to spool length can be considerably smaller than that of conventional fixed bed gasifiers like the Imbert. This small aspect ratio has definite advantages. It permits long residence times for processes like heating and torrefaction or pyrolysis which allows for more complete thermal processing. Smaller aspect ratios permit more even heat distribution across the feedstock 27 cross sectional area 55 of FIG. 10 thus reducing or eliminating cold sections. In the embodiment where some or all of reduction and tar cracking is performed within the solids pump the small aspect ratio, with or without the use of baffles 43 as described in FIG. 7, permits lengthening or shortening the reduction zone by changing the distance along the spool that gases are permitted to effect the processes. Smaller aspect ratios also allow for the use of lump capacitance heat transfer modeling which simplifies while at the same time improves the accuracy of control algorithms.

FIG. 8 shows a few embodiments that can be realized by the current invention. Prime Mover and Electrical Generator 45 pull syngas from the RGR 47 which sets up the positive pressure within the sleeve shaped chamber A. Particles in the syngas 46 are removed by the cyclone separator 113. Gases 46 can then travel through a heat exchanger 52 delivering heat to heat the feedstock 27. Also, the heat in the syngas 46 can be used to increase the temperature of an oxidant to improve system efficiency. The oxidant can also be heated by the exhaust from the prime mover 45 as is shown. Following 114 there may be a need for filtering 48 the cooled gas 46. The gas 46 can then be combusted by 45. The exhaust could then travel into chamber A to thermally process the feedstock. Alternatively the gases 46 can be drawn along by blower 111 and combusted at flare 112 and the hot gases could be directed into A to thermally process the feedstock. This would be important while the system is in startup or when the end product is Bio-char or torrefied fuel.

The oxidant can be used to drive partial or full combustion of the thermal products in the solids pump or in the reactor using oxidant blower 110.

It should be understood by those attempting to practice the teachings of this disclosure that steels and other materials like refractory ceramics appropriate for use at the temperatures of typical of the thermal processes described herein should be selected. For instance Torrefaction at or around 250° C., pyrolysis processes between 250° C. and 700° C. and gasification and reduction occurs between 700° C. and 1200° C., with preferable results attained in the 900-1000° C. range.

FIG. 9 presents some of the chemical reactions occurring in the present invention. The reactions involve both heterogeneous reactions and homogeneous reactions.

Heterogeneous reactions are reactions that arise from char particles with oxidant as well as reaction between char particles and pyrolysis gases $H_2O$, $CO_2$. The main heterogeneous reactions and standard enthalpy change are presented in FIG. 9.

Homogeneous reactions are reactions that occur among pyrolysis gases and oxidant. Homogeneous reactions are relatively simple and fast compared to heterogeneous reactions. Moreover, many of these gas phase reactions can achieve chemical equilibrium at operating temperatures above around 8000° C. FIG. 9 lists the homogeneous gas phase reactions that take place where the rate of each reaction is heavily dependent on the choice of oxidant and operating conditions.

Some of the reactions of FIG. 9 (e.g. i and ii and or x through xii) are exothermic reactions and therefore raise the overall gas temperature and provide heat to drive the endothermic reduction processes iv and v. However, oxidation reactions from equations x to xii have an adverse effect on the gas heating value if the oxidant and therefore the product gas is burdened by the unreactive $N_2$ contained in air. This is one of the primary reasons why the current invention is more efficient since the current invention permits recycling heat from processes and indirect heating so that less oxidant is required to drive the reduction reactions and so less heat is needed from reactions i and ii and x to xii. In particular less $N_2$ is introduced to dilute the syngas if air is the oxidant.

In an embodiment where it is the intention to carry out some or all of the reduction within the solids pump itself the tar cracking and reduction processes could be supplied the necessary heat to maintain the reduction reaction by mostly heating the feedstock in chamber B and A through indirect conductive and radiative heating as described herein and or oxidant starved convective heating.

Only if necessary, and based on sensor feedback, the invention has the option of introducing a limited amount of oxidant carrying gases into chamber A. This is accomplished through the use of the baffles described herein as well as the valving 120 of FIG. 8 and the controller 121. These oxidants could penetrate into the feedstock 27 along the length of the spool 1 disposed within Chamber A and partially combust the char and/or pyrolysis gases according to reactions i, ii, x, and or xi or xii in FIG. 9 thereby generating the appropriate amount of heat to sustain the endothermic char conversion reactions iv, v, iii, and homogeneous reactions vi through viii of FIG. 9. In this embodiment it could make sense to cool instead of heat the outside of the spool walls 34, 35 and 36 and hoop 3 of FIG. 10 to control the temperatures of the spool and hoop.

In addition to controlling the pressurization of the chambers (e.g. A and B of FIG. 8) to affect the rate of processes of heating, torrefaction, pyrolysis, gasification and reduction along the spool 1 it is also possible to affect each of these processes in a similar way by creating a vacuum at the reactor 9 of FIG. 1. Doing so contributes directly to the differential pressure drop between the annulus space 2 and the inner spool volume 25 of FIG. 3. This vacuum could be created by blowers 111 FIG. 8 or by the suction drawn by the prime mover 45 of the electrical generation unit 45 of FIG. 8 or by any number of other means understood in the art.

Figure 10:
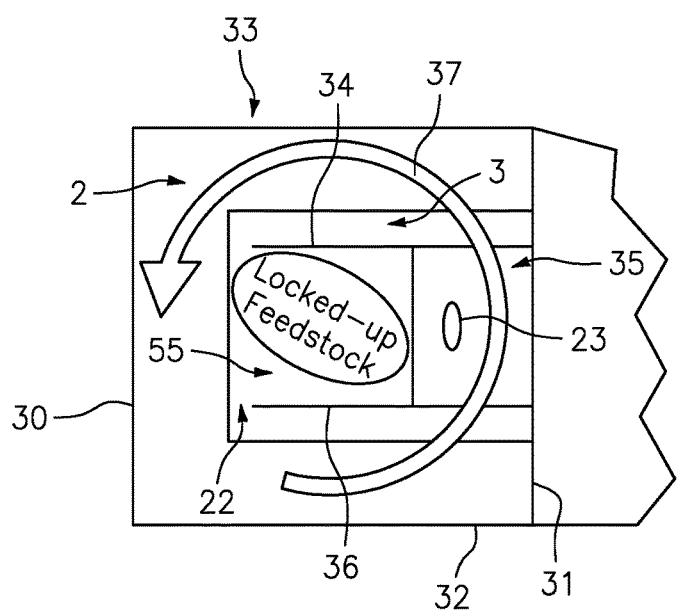
FIG. 10 is a sectional view taken along the line C-C of FIG. 5.

FIG. 10 shows a cross section CC of FIG. 5. While the hoop wall 3 of FIG. 10 is shown as an outer wall of curved passage 25 of FIG. 3 it is understood by those practiced in the art of bulk solids pumps that the hoop wall or walls are the stationary walls of curved passage 25. That is to say curved passage 25 is defined by stationary and non-stationary walls. The hoop makes up the stationary walls and the spool makes up the non-stationary walls of the curved passage. For example, spool wall 35 of FIG. 10 if made stationary would become the second wall of the hoop defining curved passage 25, the first wall being hoop wall 3.

Only a portion of the spool's (1) circumference and the associated curved passage 25 of FIG. 10 within can be fitted with a sleeve shaped chamber. This chamber can have bulkheads like those described in FIG. 6 to contain heated, oxidant starved and/or oxygenated gases 37, in a similar fashion to that which has already been described herein. Passageways could be provided for inside the sleeve shaped chamber to allow for gases to pass into the solid fuel as has been described already herein for a fully circumferential chamber. Of course, if the sleeve shaped chamber is fixed around a non-moving hoop wall sliding seals would not be required and the bulkheads could seal to the hoop wall.

The promising results for near complete char and tar consumption and very low syngas tar content achieved by multi-stage gasifiers by separating the thermal processing into independent processes are potentially realizable with the current invention. Gøbel, B., et al, in an article entitled "Status-2000 Hours Of Operation With The Viking Gasifier" describes a two stage gasifier which recycles process heat and separates the processes of pyrolysis and the concomitant char production from reduction and tar cracking. In one zone pyrolysis occurs. This zone delivers pyrolysis gases, tar and char to a separate zone where reduction is allowed to proceed as an independent process. Recycling heat and disentangling the processes of pyrolysis and char production from reduction allows the Viking gasifier to increase efficiency and greatly reduce tar content in the syngas. A multi-stage gasifier may be naturally realized with an apparatus in accordance with the present invention.

The aspect ratio and design of the current invention permits much more effective heat transfer of waste heat into places where it is needed. The aspect ratio and design of the current invention permits convective heat transfer from waste heat into the feedstock 27. This would be much more difficult and limited in the Imbert or downdraft designs.

Unlike the Imbert or downdraft machines the apparatus in accordance with the present invention can run continuously and is self-cleaning. Unlike known downdraft gasification apparatus that can only provide a limited amount of feedstock 27 heating because of aspect ratios inherent in these designs the apparatus in accordance with the present invention has no such limitations.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

The invention claimed is:

1. A method for thermally processing a solid fuel comprising:
    providing a heated gas from an external source;
    providing a bulk solids pump configured to move the solid fuel therein which includes a spool supported for rotational movement about an axis, and inlet, and outlet, a curved passage within the spool disposed in communication between said inlet and said outlet;
    providing a hoop surrounding at least an angular portion of the spool and mounting the hoop in fixed relationship to the axis of the spool whereby upon rotation of the spool there is relative motion between the spool and the hoop;
    providing one or more sleeve shaped chambers surrounding all or a portion of at least an axial extent of the said curved passage to permit containment of the heated gas within the sleeve shaped chamber(s);
    providing bulkheads at the axial extremities of a at least one of the sleeve shaped chambers;
    thermally processing said solid fuel within said pump into a thermally processed solid fuel;
    providing a plurality of passageways defined in said spool and or hoop; and
    providing a combustible gas to at least one of the sleeve shaped chambers and combusting the combustible gas within the sleeve shaped chamber.

2. The method of claim 1 further including providing a barrier at the outlet of the solids pump.

3. The method as described in claim 1 further including providing a combustible gas to at least one of the sleeve shaped chambers and combusting the combustible gas within the sleeve shaped chamber to produce heated gases which penetrate into said passageways.

4. A system for thermally processing a solid fuel comprising:
    a bulk solids pump configured to move the solid fuel therein and wherein the pump comprises:
    a spool supported for rotational movement about an axis and having a geometric axis;
    a hoop surrounding at least an angular portion of said spool, said hoop being mounted in fixed relationship to said axis whereby upon rotation of said spool there is relative motion between said spool and said hoop;
    an inlet to receive the solid fuel;
    an outlet;
    an input port to receive a heated gas;
    a curved passage within said spool disposed in communication with said inlet;
    one or more sleeve shaped chambers surrounding all or a portion of at least an axial extent of said curved passage to permit containment of the heated gas to heat the solid fuel within said curved passage to thermally process said solid fuel within said pump into a thermally processed solid fuel;
    the outlet in communication with the curved passage to receive the thermally processed solid fuel;
    wherein the thermally processed fuel comprises torrefied fuel, char, tar, pyrolysis gases and/or syngas; and
    wherein said spool has a hollow center and wherein said is carried by at least three shafts that are radially spaced from the geometric axis of the spool whereby part of the spool proximate to the geometric axis thereof is accessible.

5. The system of claim 4 wherein one or more of the shafts are radially spring loaded.

6. The system as described in claim 4 further including a sliding seal between said hoop and said spool.

7. The system of claim 4 further including a barrier disposed at said outlet of said solids pump.

* * * * *